(12) United States Patent
Blas, Jr. et al.

(10) Patent No.: US 8,982,132 B2
(45) Date of Patent: Mar. 17, 2015

(54) VALUE TEMPLATES IN ANIMATION TIMELINES

(75) Inventors: Joaquin Cruz Blas, Jr., Pacifica, CA (US); James W. Doubek, Sunnyvale, CA (US)

(73) Assignee: Adobe Systems Incorporated, San Jose, CA (US)

( * ) Notice: Subject to any disclaimer, the term of this patent is extended or adjusted under 35 U.S.C. 154(b) by 666 days.

(21) Appl. No.: 13/036,305

(22) Filed: Feb. 28, 2011

(65) Prior Publication Data

US 2013/0127875 A1 May 23, 2013

(51) Int. Cl.
*G06T 13/00* (2011.01)

(52) U.S. Cl.
CPC ............. *G06T 13/00* (2013.01); *G06T 2213/08* (2013.01); *Y10S 345/951* (2013.01)
USPC ........... 345/473; 345/475; 345/474; 345/619; 345/427; 345/951; 715/234; 715/238; 715/762; 715/256; 715/763

(58) Field of Classification Search
CPC ......... G06T 13/40; G06T 13/00; G06T 13/80; G06T 13/20; A63F 13/10
USPC .......... 715/234, 238, 762, 256, 763; 345/473, 345/475, 474, 619, 427, 951
See application file for complete search history.

(56) References Cited

U.S. PATENT DOCUMENTS

| | | | |
|---|---|---|---|
| 6,414,685 B1 * | 7/2002 | Takakura et al. ............. | 345/473 |
| 6,546,397 B1 * | 4/2003 | Rempell ............................... | 1/1 |
| 7,155,676 B2 * | 12/2006 | Land et al. ..................... | 715/731 |
| 7,511,718 B2 * | 3/2009 | Subramanian et al. ........ | 345/619 |
| 7,594,168 B2 * | 9/2009 | Rempell ........................ | 715/234 |
| 7,804,503 B2 * | 9/2010 | Fernandez et al. ............ | 345/475 |
| 7,877,690 B2 * | 1/2011 | Margulis ........................ | 715/723 |
| 8,134,558 B1 * | 3/2012 | Mayhew ........................ | 345/473 |
| 2003/0110297 A1 * | 6/2003 | Tabatabai et al. ............. | 709/246 |
| 2004/0120010 A1 * | 6/2004 | Back et al. ..................... | 358/1.18 |
| 2004/0207628 A1 * | 10/2004 | Hoddie et al. ................. | 345/473 |
| 2004/0233201 A1 * | 11/2004 | Calkins et al. ................. | 345/473 |
| 2005/0060648 A1 * | 3/2005 | Fennelly et al. .............. | 715/523 |
| 2005/0156932 A1 * | 7/2005 | Vienneau et al. ............. | 345/473 |
| 2006/0174187 A1 * | 8/2006 | White et al. ................. | 715/501.1 |
| 2006/0188229 A1 * | 8/2006 | Yamagata et al. .............. | 386/95 |

(Continued)

OTHER PUBLICATIONS

Katherine Ulrich, Flash 4 for Windows and Macintosh: Visual QuickStart Guide 1999 book, Peachpit Press Berkeley, CA, USA © 1999, Absract pp. 1-4.*

*Primary Examiner* — Abderrahim Merouan
(74) *Attorney, Agent, or Firm* — Wolfe-SBMC

(57) ABSTRACT

Methods and systems for animation timelines using value templates are disclosed. In some embodiments, a method includes generating a data structure corresponding to a graphical representation of a timeline and creating an animation of an element along the timeline, where the animation modifies a property of the element according to a function, and where the function uses a combination of a string with a numerical value to render the animation. The method also includes adding a command corresponding to the animation into the data structure, where the command is configured to return the numerical value, and where the data structure includes a value template that produces the combination of the string with the numerical value. The method further includes passing the produced combination of the string with the numerical value to the function and executing the function to animate the element.

20 Claims, 21 Drawing Sheets

(56) References Cited

U.S. PATENT DOCUMENTS

| | | | |
|---|---|---|---|
| 2007/0006079 A1* | 1/2007 | Jewsbury et al. | 715/716 |
| 2007/0132779 A1* | 6/2007 | Gilbert et al. | 345/619 |
| 2007/0165031 A1* | 7/2007 | Gilbert et al. | 345/473 |
| 2007/0168600 A1* | 7/2007 | Anthony et al. | 711/108 |
| 2007/0179641 A1* | 8/2007 | Lucas et al. | 700/83 |
| 2008/0055315 A1* | 3/2008 | Ducharme | 345/473 |
| 2009/0177301 A1* | 7/2009 | Hayes | 700/94 |
| 2009/0322760 A1* | 12/2009 | Kwiatkowski et al. | 345/473 |
| 2010/0119100 A1* | 5/2010 | DeVine | 381/381 |
| 2010/0168874 A1* | 7/2010 | Lucas et al. | 700/17 |
| 2010/0188410 A1* | 7/2010 | Gilbert et al. | 345/473 |
| 2010/0241953 A1* | 9/2010 | Kim et al. | 715/256 |

* cited by examiner

```
var showBike1_TLD = [ { tween: ["style", "#bike1", "left", "-1000px" ], position: 0, duration: 0 }, { tween: ["style", "#bike1", "left", "-345px" ], position: 10, duration: 2490, easing: "easeInOutQuad" }, { tween: ["style", "#bike1", "opacity", "1" ], position: 0, duration: 2500, easing: "easeInOutQuad" }, { tween: ["style", "#bike2", "left", "1000px" ], position: 0, duration: 1800 }, { tween: ["style", "#bike2", "opacity", ".2" ], position: 0, duration: 1800 }

```
Spry.createTimelineFromData = function(arr)
{
        var tl = jQuery.Spry.createTimeline();
        var alen = arr.length;
        for (var i = 0; i < alen; i++)
        {
                var d = arr[i];
                var s = null;
                if (d.timeline) {
                        s = Spry.createTimelineFromData(d.timeline);
                }
                else if(d.tween) {
                        s = Spry.createTween.apply(null, d.tween);
                }
                else if(d.trigger) {
                        s = Spry.createTween.apply(null, d.trigger);
                } if(s)
                        tl.add(s, d.position, d.duration, d.easing);
        }
        return tl;
};
```

FIG. 6

```
var showBike_TLD = [
    800
    { tween: [ "style", "${bikeToShow}", "left",    "-1000px" ], position:  0, duration:    0 },
    { tween: [ "style", "${bikeToShow}", "left",    "-345px" ],  position: 10, duration: 2490, easing: "easeInOutQuad" },
    { tween: [ "style", "${bikeToShow}", "opacity", "1" ],       position:  0, duration: 2500, easing: "easeInOutQuad" },
    { tween: [ "style", "${bikeToHide}", "left",    "1000px" ],  position:  0, duration: 1800 },
    { tween: [ "style", "${bikeToHide}", "opacity", ".2" ],      position:  0, duration: 1800 }
];
```

FIG. 8

```
ptimeline_TLD = [
        {
                "tween",
                [ "style", "${bikeToShow}", "${prop1}",
"${val1}" ],
                position: "${pos}",
                duration: "${duration}",
                easing: "${easing}"
        }
]; ...
var dictionary = {
        bikeToShow: "#bike1",
        prop1: "left",
        val1: "100px",
        position: 2500,
        duration: 1000,
        easing: "easeInOutQuad"
}
...
var paramTimeline = createTimlineFromData(ptimeline_TLD);
paramTimeline.play(dictionary);
```

FIG. 10

```
// Attach click handlers that trigger bike animations.

$("#nav_Bike1").click(function(e)
    {
        $("#large_Bike1, #large_Bike2,
#large_Bike3").singleSelectSet('selectMember', "#large_Bike1");
        e.preventDefault();
    });

$("#nav_Bike2").click(function(e)
    {
        $("#large_Bike1, #large_Bike2,
#large_Bike3").singleSelectSet('selectMember', "#large_Bike2");
        e.preventDefault();
    });

$("#nav_Bike3").click(function(e)
    {
        $("#large_Bike1, #large_Bike2,
#large_Bike3").singleSelectSet('selectMember', "#large_Bike3");
        e.preventDefault();
    });
});
```

*FIG. 12*

```
#foo {
    transform: scale(2) rotate(45deg) translate(50px,100px);
}
#bar {
    transform: translate(100px,100px) scale(0.5)
}
```

FIG. 14

```
var timline_TLD = [
    {
        "tween",
        [
            "style",
            "transform", 1610
            "90deg",
            {from: "0deg", valueTemplate: "rotate(@@0@@)"} 1620
        ],
        1600
        position: 1000,
        duration: 500
    }
];
```

*FIG. 16*

```
var timline_TLD = [
    {
    "tween",
    [
        "style",
        "transform",
        ["500px", "90deg"],   1700
        {
            from: ["0px", "0deg"],   1710
            valueTemplate: "translate(100px,@@0@@) rotate(@@1@@)"   1720
        },
    },
    position: 1000,
    duration: 500
    }
];
```

FIG. 17

```
var timline_TLD = [
    {
        "tween",
        [
            "style",
            "transform",
            { y: "500px", angle: "90deg" },    1800
            {
                from: { y: "0px", angle: "0deg" },           1810
                valueTemplate: "translate(100px,@@y@@) rotate(@@angle@@)"    1820
            }
        ],
        position: 1000,
        duration: 500
    }
];
```

*FIG. 18*

```
var timline_TLD = [
    {
        "tween",
        [
            "style",
            "transform",
            { y: "500px", angle: "90deg" },
            { y: "0px", angle: "0deg" },
            {
                valueTemplate: "translate(100px,@@round(y)@@) rotate(@@floor(angle)@@)"
            }
        ]
    },
    position: 1000,
    duration: 500
    }
];
```

```
var timline_TLD = [
  {
    "tween",
    [
      "style",
      "transform",
      { y: "500px", angle: "90deg" },
      {
        from: { y: "0px", angle: "0deg" },
        valueTemplate: "translate(100px,@@y@@) rotate(@@angle@@)",
        formatters: { y: Math.round, angle: Math.floor }
      }
    ],
    position: 1000,
    duration: 500
  },
  {
  }
];
```

2000 — valueTemplate line
2010 — formatters line

FIG. 20

VALUE TEMPLATES IN ANIMATION TIMELINES

BACKGROUND

This specification relates to computer programming, and, more particularly, to value templates in animation timelines.

Some animations or multimedia presentations may include one or more "actors" (e.g., images) performing various tasks, movements, or transitions on a "stage" (e.g., a screen or display). For example, a relatively simple animation may include a transition that hides or shows an object in a computer window. Meanwhile, a more complex animation may include a set of two or more actors (e.g., images of human characters), each actor having a set of elements (e.g., head, arms, body, legs, etc.) that may be displayed in a coordinated or choreographed manner to give the viewer the impression that the actors are moving (e.g., walking, jumping, etc.) across the screen.

In traditional timeline-based animation applications, in order to create more than one hide or show transition for more than one actor, a designer has traditionally taken one of two approaches. First, the designer may perform the animation completely in software code. Alternatively, the designer may create an animation on a timeline for each transition/actor combination, and then use software code to programmatically jump to a selected place in the timeline in order to execute the appropriate combination.

SUMMARY

This specification is related to systems and methods for generating, using, and/or executing timelines in an animation application (e.g., animation design software, website development program, Internet browser, etc.) using value templates. In some embodiments, the timeline techniques described herein may be used to manipulate and choreograph any technology available via JavaScript, for example, including audio, video, DOM elements (e.g., XML, HTML, SVG, etc), other JavaScript functions and libraries (including those that manage drawing into bitmap elements such as Canvas). These techniques may also be used to manipulate properties on an Internet browser (e.g., viewport scroll position, window title or window dimensions) and/or to trigger communication between frames, windows, or a client and a server.

In some embodiments, a method may include generating a data structure corresponding to a graphical representation of a timeline and creating an animation of an element along the timeline, where the animation modifies a property of the element according to a function, and where the function uses a combination of a string with a numerical value to render the animation. The method may also include adding a command corresponding to the animation into the data structure, where the command is configured to return the numerical value, and where the data structure includes a value template that produces the combination of the string with the numerical value. The method may further include passing the produced combination of the string with the numerical value to the function and executing the function to animate the element.

In some embodiments, the function may include a Cascading Style Sheets (CSS), a Scalable Vector Graphics (SVG) function, or the like. Moreover, certain techniques disclosed herein allow an animation program to generate formatted property/attribute values for use during each update step of an animation. As such, these techniques allow developers and/or users to animate complex CSS properties and DOM attributes, for example.

In other embodiments, a computer-readable storage medium may have instructions stored thereon that, upon execution by a computer system, cause the computer system to receive a request to render an animation and parse a command within a data structure corresponding to the animation, where the command is configured to output a numerical value, and where the data structure includes a value template that produces a modified version of the numerical value. The instructions may also cause the computer system to execute the command and render the animation, at least in part, by providing the modified version of the numerical value to a function configured to apply the modified version of the numerical value to an object property.

In yet other embodiments, a system may include at least one processor and a memory coupled to the at least one processor, where the memory stores program instructions, and wherein the program instructions are executable by the at least one processor to receive a request to render an animation. For example, the animation may include a timeline data structure, and the timeline data structure may include a plurality of commands. The program instructions may be executable to also cause the processor to parse the plurality of commands, execute at least one of the plurality of commands, and in response to the execution, receive an output property value. The program instructions may be executable to also cause the processor to add a string to the output property value defined by a value template declared within the timeline data structure to create a modified output property value and pass the modified output property value to a library function.

BRIEF DESCRIPTION OF THE DRAWINGS

FIG. 4 is an example of a declarative timeline data structure according to some embodiments.

FIG. 6 is an example of a function configured to execute a declarative timeline according to some embodiments.

FIG. 8 is an example of a parameterized timeline data structure according to some embodiments.

FIG. 10 is an example of another parameterized timeline data structure according to some embodiments.

FIG. 12 is an example of an event-based parameter replacement function according to some embodiments.

FIG. 14 is an example of a property having complex values according to some embodiments.

FIG. 16 is an example of a timeline data structure having a value template according to some embodiments.

FIG. 17 is an example of a timeline data structure having a value template that uses an array of values according to some embodiments.

FIG. 18 is an example of a timeline data structure having a value template that uses a dictionary of values according to some embodiments.

FIG. 19 is an example of a timeline data structure having a formatting function within a placeholder according to some embodiments.

FIG. 20 is an example of a timeline data structure having a user-defined formatting function according to some embodiments.

Figure 1:
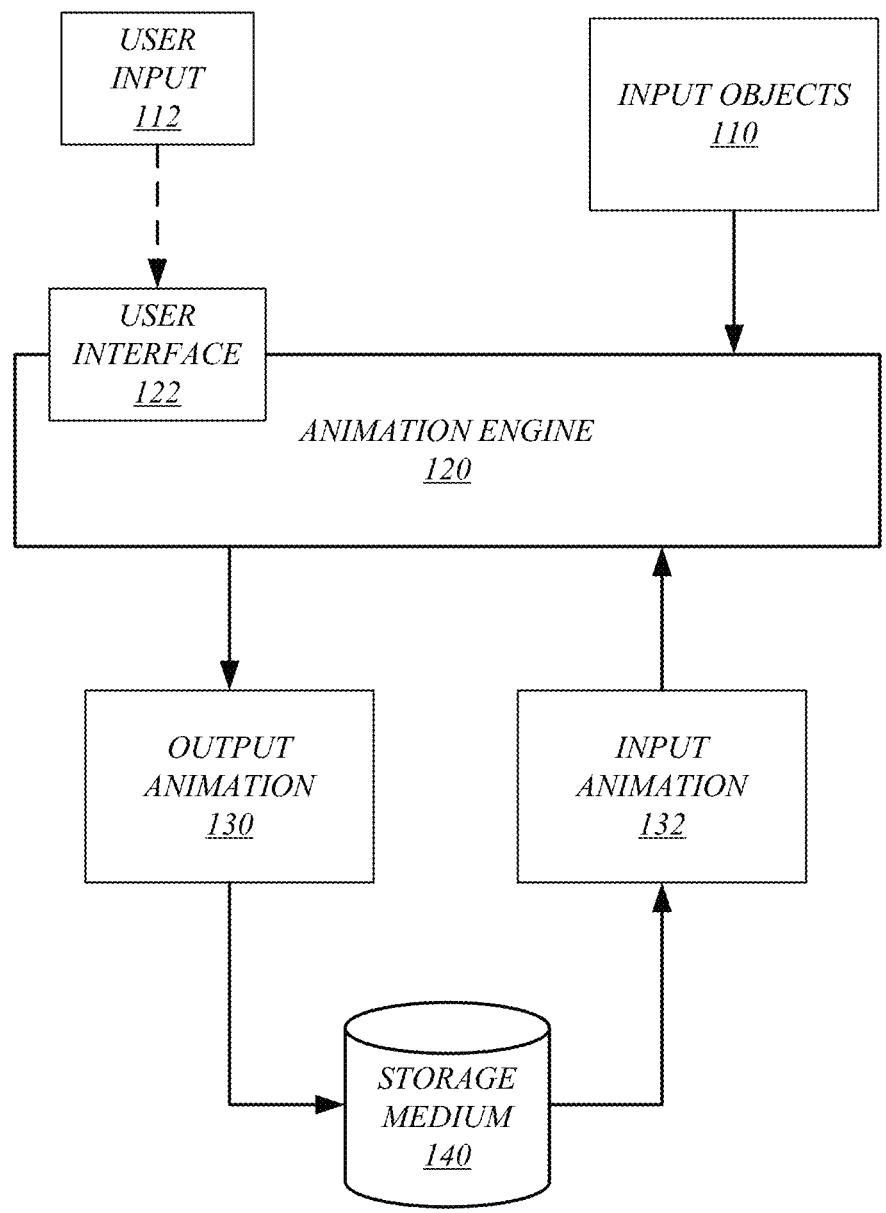
FIG. 1 is a block diagram of an animation software program configured to implement various systems and methods disclosed herein according to some embodiments.

While this specification provides several embodiments and illustrative drawings, a person of ordinary skill in the art will recognize that the present specification is not limited only to the embodiments or drawings described. It should be understood that the drawings and detailed description are not intended to limit the specification to the particular form disclosed, but, on the contrary, the intention is to cover all modifications, equivalents and alternatives falling within the spirit and scope of the claims. The headings used herein are for organizational purposes only and are not meant to be used to limit the scope of the description. As used herein, the word "may" is meant to convey a permissive sense (i.e., meaning "having the potential to"), rather than a mandatory sense (i.e., meaning "must"). Similarly, the words "include," "including," and "includes" mean "including, but not limited to."

DETAILED DESCRIPTION OF EMBODIMENTS

Copyright Notice

A portion of the disclosure of this patent document contains material which is subject to copyright protection. The copyright owner has no objection to the facsimile reproduction by any one of the patent document or the patent disclosure, as it appears in the Patent and Trademark Office patent file or records, but otherwise reserves all copyright rights whatsoever.

Introduction

This detailed description first discusses an illustrative animation software program, followed by an example of a graphical user interface for such a program. The description then discloses various techniques for creating and processing declarative timeline data structures, as well as by techniques for parameterizing those timelines. The specification further discloses techniques for using value template within timelines. Lastly, the description discusses a computing system configured to implement certain embodiments disclosed herein. The term "animation," as used throughout this specification, may include an animation, graphical presentation, multimedia content, advertisement, motion picture, film, movie, cartoon, or the like.

In the following detailed description, numerous specific details are set forth to provide a thorough understanding of claimed subject matter. However, it will be understood by a person of ordinary skill in the art in light of this specification that claimed subject matter may be practiced without necessarily being limited to these specific details. In some instances, methods, apparatuses or systems that would be known by a person of ordinary skill in the art have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

An Animation Software Program

FIG. 1 shows a block diagram of an example of an animation software program configured to implement one or more of the various systems and methods disclosed herein. In some embodiments, the animation software may be part of an animation design environment and may be executed on a computing device such as described in FIG. 13, for example. As illustrated, user input 112 may be provided to animation engine 120 via user interface 122 and it may allow a user (e.g., an animation designer or a viewer) to interact with the animation software. As such, user input 112 may include any kind of input received through any suitable device, such as, for example, a mouse, track pad, touch screen, keyboard, microphone, camera, or the like. In alternative embodiments, user input 112 may be at least in part replaced with a script or program to automate at least some of the techniques described herein.

To design a new animation, animation engine or module 120 may receive user input 112 requesting that a new animation file or project be created. Thereafter, the user may request, for example, that one or more input objects 110 (e.g., an image, sound and/or video clip) be added to the animation. Examples of image files and formats include JPEG, JFIF, TIFF, RAW, PNG, GIF, BMP, CGM, SVG, PNS, and JPS, among others. The user may then continue to interact with animation engine 120, for example, by changing a property (e.g., a position, color, font, background, opacity, etc.) of the newly added image over time, which may be graphically represented in a "timeline." Once the animation is complete, the animation engine may create output animation 130 and store it in storage medium 140. As described in more detail below, storage medium 140 may include a system memory, a disk drive, DVD, CD, etc. Additionally or alternatively, animation engine 120 may retrieve input animation 132 from storage medium 140 to allow the user to further develop an existing animation or file.

In some embodiments, animation engine 120 may include a number of routines, algorithms, functions, and/or libraries that expose an application programming interface (API) that allows a user to create an animation, presentation, multimedia file, or the like. For example, in a case where output animation 130 is encoded in a HyperText Markup Language (HTML) file for display on a web browser or the like (e.g., Internet Explorer®, Firefox®, Safari®, Chrome®, etc.), animation engine 120 may include implementations of scripting languages (e.g., JavaScript) and associated libraries (e.g., jQuery) that allow the user to encode an animation within an HTML file using a particular API. More generally, animation engine 120 may include software code that allows the user to implement any number of technologies such as, for example, HTML, Java, JavaScript, Cascading Style Sheets (CSS), Scalable Vector Graphics (SVG), Canvas (a procedural model that updates bit maps in HTML), etc. that may be suitable for animating content. In some embodiments, the functions disclosed in the sections presented below may be performed by animation engine 120 implemented by program instructions stored in a computer-readable storage medium and executable by one or more processors (e.g., one or more CPUs or GPUs).

Animation engine 120 may further include a layout engine (not shown) to enable the rendering of web pages or the like. For example, in certain embodiments, animation engine 120 may include a WebKit module that is configured to display of web content in windows, executes JavaScript, and also to implement other browser features (e.g., clickable links, etc.). In other embodiments, however, any other suitable rendering engine may be implemented as part of animation engine 120.

A User Interface

Figure 2:
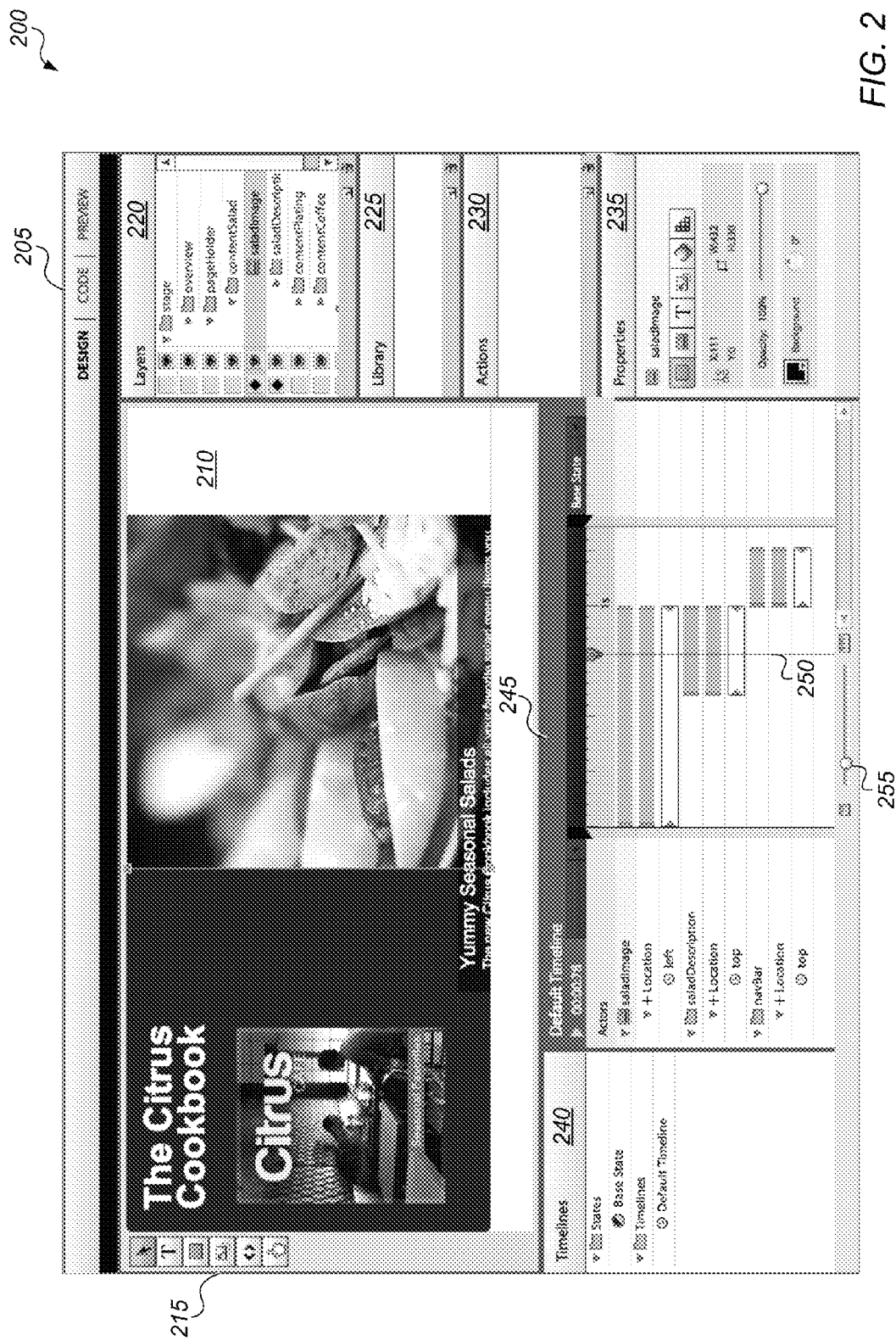
FIG. 2 is a screenshot of a user interface of a software program configured to implement systems and methods disclosed herein according to some embodiments.

Turning to FIG. 2, an illustrative user interface (UI) 200 of an example software program configured to implement various systems and methods disclosed herein is depicted. In some embodiments, UI 200 may be implemented as user interface 122 of animation engine 120 described in FIG. 1. As shown, UI 200 includes menu 205 that allows selection of a design view, code view, or preview view. The selected view ("design," in this case) may be bolded to indicate the current state of UI 200. When in design view, UI 200 may display a variety of menus, windows or panels (e.g., 210-245), and/or toolboxes (e.g., 215) that allow a user to create or develop an animation, presentation, advertisement, motion picture, or the like. The code view may display resulting software code (e.g., HTML) that may be rendered or executed to reproduce the animation, whereas the preview view may present the animation as it would appear in a selected Internet browser, media player, or the like.

As illustrated, UI 200 includes stage 210 where an animation is graphically developed by the user. For example, the user may open or import one or more images, objects, or "actors" (e.g., input objects 110 of FIG. 1) and place them on stage 210. Toolbar or toolbox 215 may allow the user to make certain modifications to those actors. Additionally or alternatively, toolbox 215 may allow a user to create certain types of actors (e.g., text, lines, geometric figures, etc.) and add them directly to stage 210. UI 200 also includes layer window or panel 220 configured to show Document Object Model (DOM) elements of the underlying HTML code, as well as library window or panel 225, which is configured to dynamically display object or animation libraries that may be available to the user during operation. For example, in some embodiments, an animation library may allow a user to introduce an existing function to an animation. Similarly, UI 200 may include actions window or panel 230, which may be configured to dynamically display actions that allow the user to create event-based animation (e.g., in response to a user "clicking" on a particular actor, etc.).

UI 200 further includes properties window or panel 235 configured to show certain properties that are associated with a selected actor or object ("saladimage," in this example). In some cases, properties panel 235 may expose object properties that may be modified by a user. For example, if the object is a graphical element, applicable properties may include, but are not limited to, a position, size, color, background, font type, opacity, 2-dimensional transformation (e.g., rotation, translation, etc.), and 3-dimensional transformations, among others. In the case of an audio element, for instance, properties may include, but are not limited to, level, pitch, playback speed, and sound effects (e.g., delay, reverb, distortion, etc.), among others. In some cases, by selecting a particular actor (e.g., on state 210) and modifying a given property in panel 235 that is associated with that actor, UI 200 may allow the user to "animate" that actor.

UI 200 includes timeline panel 240, which enables the user to select an existing timeline or to create a new timeline upon which the animation may be developed. In some embodiments, a designer may develop two or more timelines simultaneously and/or one timeline nested within another. Upon selection or creation of a particular timeline in panel 240, the selected timeline appears in panel 245. In this example, a "default timeline" is shown in panel 245. As illustrated, timeline panel 245 is configured to animate three actors—i.e., "saladimage," "saladDescription," and "navbar." In some embodiments, timeline panel 245 enables a user to add, remove, or select one or more of the available actors to the selected timeline by "dragging-and-dropping" the actor in and out of timeline panel 245. As shown in FIG. 2, location properties of each actor ("left," "top," and "top," respectively) are configured to change over time, although in general any property of any actor may be added or removed from the current or default timeline.

In some embodiments, timeline panel 245 may include a "playhead" or "timeline cursor" 250 that indicates the point in time of the animation that is currently playing, or the point where playback will start when the user initiates or plays the animation. In some embodiments, a user may click and drag playhead 250 along the timeline to move to a different portion of the animation. Furthermore, panel 210 may be synchronized with panel 245 such that, while the user moves playhead 250 around, panel 210 approximately simultaneously displays a corresponding portion of the animation.

In some embodiments, panel 245 may include a bar (e.g., bar 260) or some other graphical representation that indicates the start time, end time, and/or duration of the animation of each property of each actor being modified over time. For example, panel 245 shows that the "left" property of the "saladimage" actor begins to be modified at t=0 seconds, and that the "top" property of the "saladDescription" actor begins to be modified sometime after that. The modifications to both properties of both actors ends simultaneously at t=1 seconds. In other words, the different animations of "saladimage" and "saladDescription" occur at least partially in parallel. On the other hand, the modification to the "top" property of the "navbar" actor begins at t=1 seconds and continues on its own afterwards.

In some embodiments, UI 200 may be configured to allow a user to select a portion of a selected bar (e.g., the center, left and/or right edge of bar 260) and move it along the timeline to change the start time, end time, and/or duration of the animation. In addition, panel 245 may also include zoom tool 255 that allows the user to modify the scale of the timeline during the design of the animation.

The timelines depicted in panels 240 and 245 of FIG. 2 may serve as a mechanism around which an animation or presentation is synchronized or choreographed. In some embodiments, different portions of an animation may utilize different timelines that are synchronized with a master timeline or the like. For example a first animation of a first element may be synchronized around a first timeline (e.g., to roll content onto a stage) and a second animation of a second element may be synchronized with a second timeline (e.g., to roll the content off the stage) to create a "content rotator" or the like. Both the first and second timelines may be synchronized with a master timeline. Additionally or alternatively, two or more timelines may be nested within each other so that, for example, an event in one timeline may trigger execution of another timeline. In some cases, elements may be placed on the timeline and then converted to "symbols" in order to be manipulated. In other cases, elements may be retrieved dynamically during execution of an animation (e.g., from external storage or from a web server).

Declarative Timeline Data Structures

Figure 3:
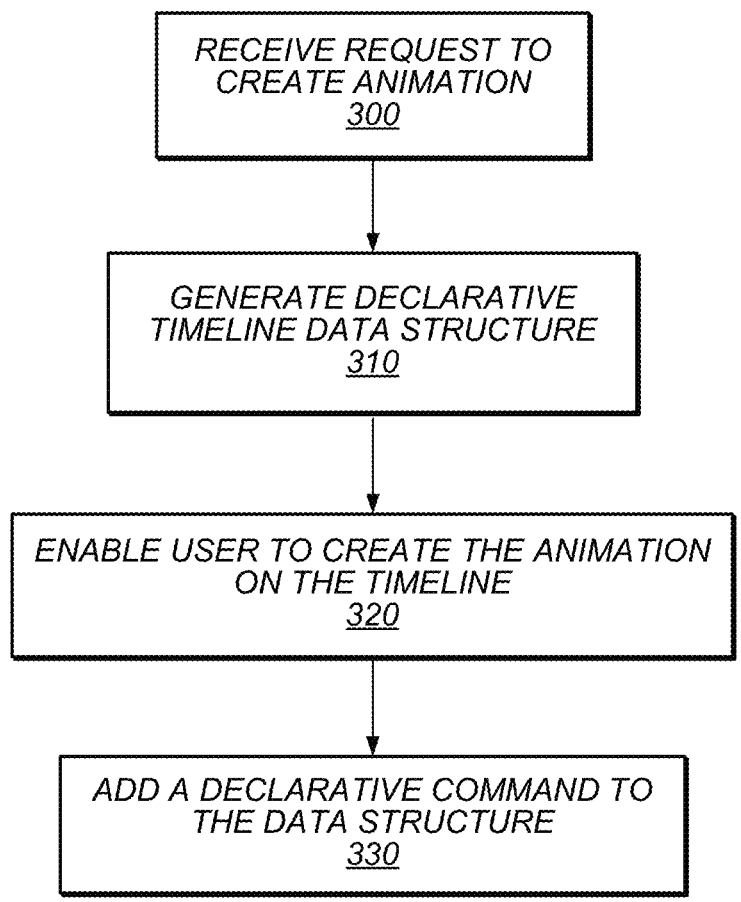
FIG. 3 is a flowchart of a method for creating a declarative timeline data structure according to some embodiments.

In some embodiments, timeline panel 245 depicted in FIG. 2 may expose a graphical representation of a declarative timeline data structure. Turning now to FIG. 3, a flowchart of a method for creating and executing a declarative timeline data structure is depicted according to some embodiments. At 300, the method receives a request to create an animation (e.g., via user input 112 shown in FIG. 1). At 310, the method generates a declarative timeline data structure. In some embodiments, the declarative timeline data structure may be created in the design view of UI 200. Additionally or alternatively, the declarative timeline data structure may be created using an HTML editor, text editor, or the like. At 320, a user may animate a particular element or image along the graphical representation of timeline. For example, the user may select that a given property of the element (e.g., position, color, opacity, etc.) change in a certain manner over time. In response to the animation, the method may add a corresponding declarative command or object to the declarative timeline data structure at 330.

FIG. 4 is an example of a declarative timeline data structure (TLD) according to some embodiments. As illustrated, a timeline "showBike1_TLD" variable has been created in JavaScript in the form of an array of declarative commands or objects. In this example, all commands are "tween" commands configured to automatically add or modify a series of frames between two existing frames, although any other command or object may be enabled in other typical implementations. This particular animation includes five (5) distinct commands, and each command has a number of attributes. Specifically, the first attribute of first command specifies that a CSS transformation is being called (i.e., "style"), and the second attribute indicates that the animation is being applied to the "bike1" element or image. The third attribute reveals that the "left" property of "bike1" is being modified, and the fourth attribute sets the end value of that property at −1000 pixels. The fifth attribute indicates the position along the timeline when the command begins to be executed (in this case, t=0), and the sixth attribute indicates the duration of the execution of the command (t=0).

The second command shown in FIG. 4 operates upon the same property ("left") of the same element ("bike1"), but the command begins execution at t=10 milliseconds and continues for 2.49 seconds. A seventh attribute sets an easing function that determines the type of interpolation between frames of the animation caused by execution of the command (e.g., "easeInOutQuad"). The third command operates on a different property ("opacity") of the same element ("bike1"), begins execution at the same time as the first command, and continues to be executed at least partially in parallel with the second command. The fourth and fifth commands perform similar functions, but on a second element ("bike 2").

The timeline data structure of FIG. 4, when executed, initially places the actor with the id of "bike1" off stage and out of view at −1000 pixels, while it places "bike 2" on the stage. It then proceeds to incrementally move bike1 to the right, frame by frame, until it appears on stage (−345 pixels); all the while, changing its opacity until it finally becomes fully visible (i.e., opacity=1). At partially in parallel with these operations, the timeline is also animating an actor called "bike2" that moves off stage to the right, while fading to the point where it can be barely visible (i.e., opacity=0.2). (For purposes of illustration, screenshots of this example animation are discussed with respect to FIG. 13 below.)

In some embodiments, a timeline data structure such as that depicted in FIG. 4 may be defined declaratively as opposed to programmatically. In other words, the timeline data structure may include serialized, declarative commands or objects. For example, the declarative timeline may not include control flow statements or other instructions whose execution results in a decision to proceed in one of two or more paths (e.g., "for" loops, "while" loops, etc.). Additionally or alternatively, the declarative timeline may not include conditional expressions (e.g., "if . . . then"). Additionally or alternatively, the declarative timeline may not include Boolean logic or operators.

In certain embodiments, a timeline data structure may be an array of elements, and each element may be a command or object that operates upon an actor to animate that actor (or otherwise modify a value of a property of that actor) over time. In some cases, timeline elements may themselves contain other timelines, thus resulting in a data structure that is tree-like. When implemented in animation engine such as engine 120 of FIG. 1, for instance, a declarative timeline data structure may include any type of command or object supported by the various technologies implemented in that engine (e.g., HTML, Java, JavaScript, CSS, SVG, Canvas, etc.).

Figure 5:
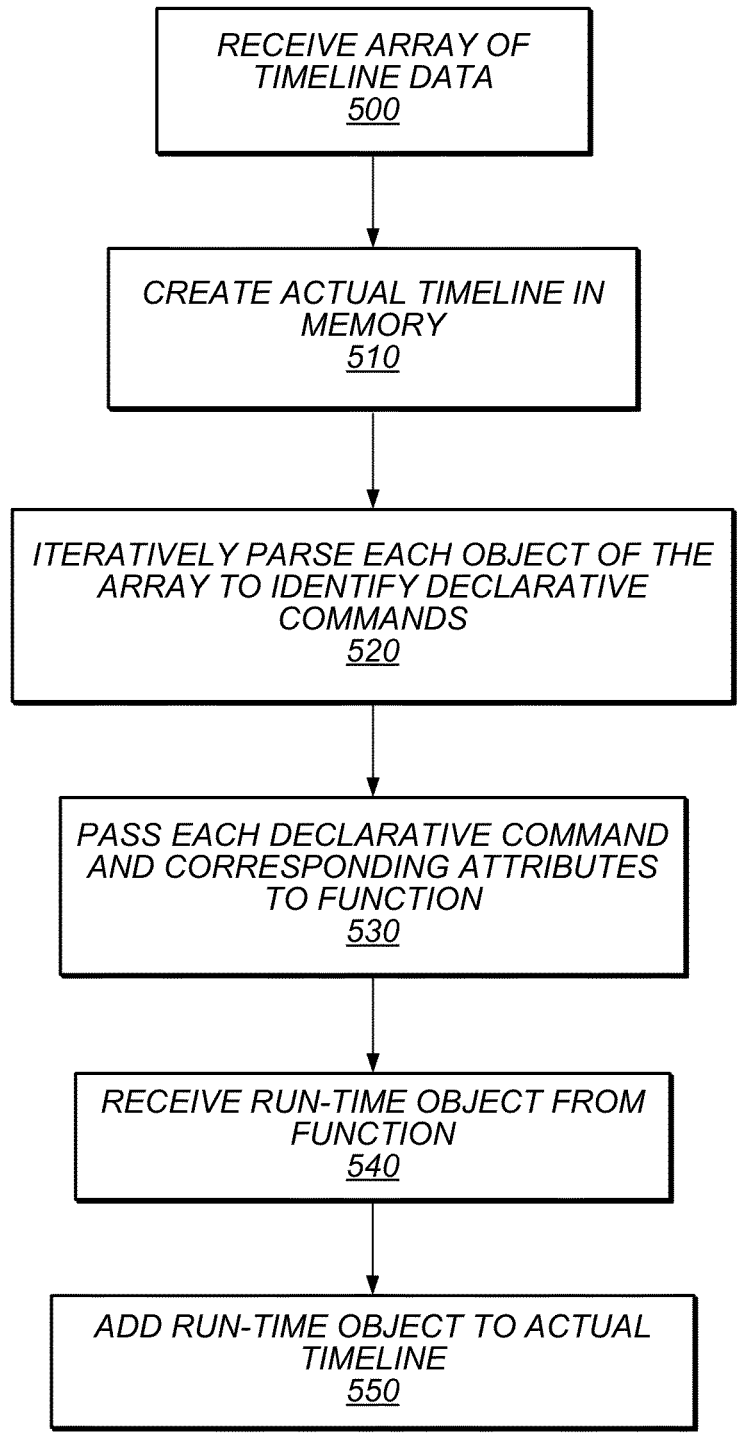
FIG. 5 is a flowchart of a method for executing or rendering an animation that includes a declarative timeline according to some embodiments.

Turning now to FIG. 5, a flowchart of a method for executing or rendering an animation that includes a declarative timeline is depicted according to some embodiments. In some cases, the method of FIG. 5 may be performed by an animation engine such as engine 120 of FIG. 1 operating in design or preview mode. Additionally or alternatively, the method of FIG. 5 may be executed by a web browser, media player, or the like. At 500, the method may receive a file (e.g., an HTML file) containing a declarative timeline data structure (e.g., an array) such as the one depicted in FIG. 4. At 510, the method may then create an actual timeline in memory (e.g., system memory). The method may then parse each command or object of the declarative data structure to identify each such command or object at 520. At 530, the method may pass each identified command or object and its corresponding attributes to an animation function configured to interpret such commands. At 540 the method may in response receive one or more run-time commands or objects corresponding to the identified declarative commands or objects as interpreted by the animation function. Then, at 550, the method may add the returned run-time commands or objects to the timeline created in the memory.

FIG. 6 shows an example of a function configured to execute a declarative timeline according to some embodiments. In this example, the "Spry.createTimelineFromData" function is used to create a timeline object based on a declarative timeline data structure such as, for example, the data structure shown as an array in FIG. 4.

Referring to both FIGS. 5 and 6, the line "var t1=jQuery.Spry.createTimeline( )" creates a variable "t1" as an actual timeline in memory, for example, as described at 510. The "var" and "for" lines that follow cause the function to step through the declarative data structure and parse each command or object in the array, for example, as described at 520. Within the "for" loop that follows, conditional "if" statements assign the particular type of command within the data structure to variable "s." First, the current object "arr[i]" is stored in variable "d," and variable "s" is assigned a "null" value. If the current object or command is a "tween" command (i.e., "d.tween" is true), for example, then the "Spry.createTween.apply" line passes the current object is to an animation function (e.g., a tween implementation) as described at 530. In response, the animation function implementation produces a run-time version of the declarative tween command and stores it in variable "s," for example, as described at 540. Then, the "t1.add(s, d.position, d.duration, d.easing" line places the returned run-time tween command along with its current attributes in the "t1" variable, for example, as described at 550. After stepping through each element of the declarative timeline data structure and adding a run-time command corresponding to each respective declarative object in the timeline, the timeline may be executed to render the animation.

In some embodiments, the method of FIG. 5 may parse trigger commands (e.g., to trigger playback of an audio file, execution of another timeline, etc.) as all as any other declarative command in the timeline data structure. Moreover, the run-time command returned by animation library may include more information (e.g., such as system level data or the like) than the declarative version of the same command to help the animation engine manipulate the objects. As such, in some embodiments the declarative version of a command added to the declarative timeline data structure may be smaller (or shorter) than the actual, run-time command that is executed during the rendering of the animation.

Parameterized Timelines

In some embodiments, a declarative timeline data structure such as the described in the preceding section may be parameterized in whole or in part. In some embodiments, parameterizing a timeline refers to the replacement of specific actors, properties, values, and/or elements with named generic placeholders or strings. At run-time, the same parameterized timeline may be used (and re-used) to animate and/or modify one or more different actors, properties, values, and/or elements. Additionally or alternatively, the parameterized timeline may use different key frame values create transitions among any number of target values.

Figure 7:
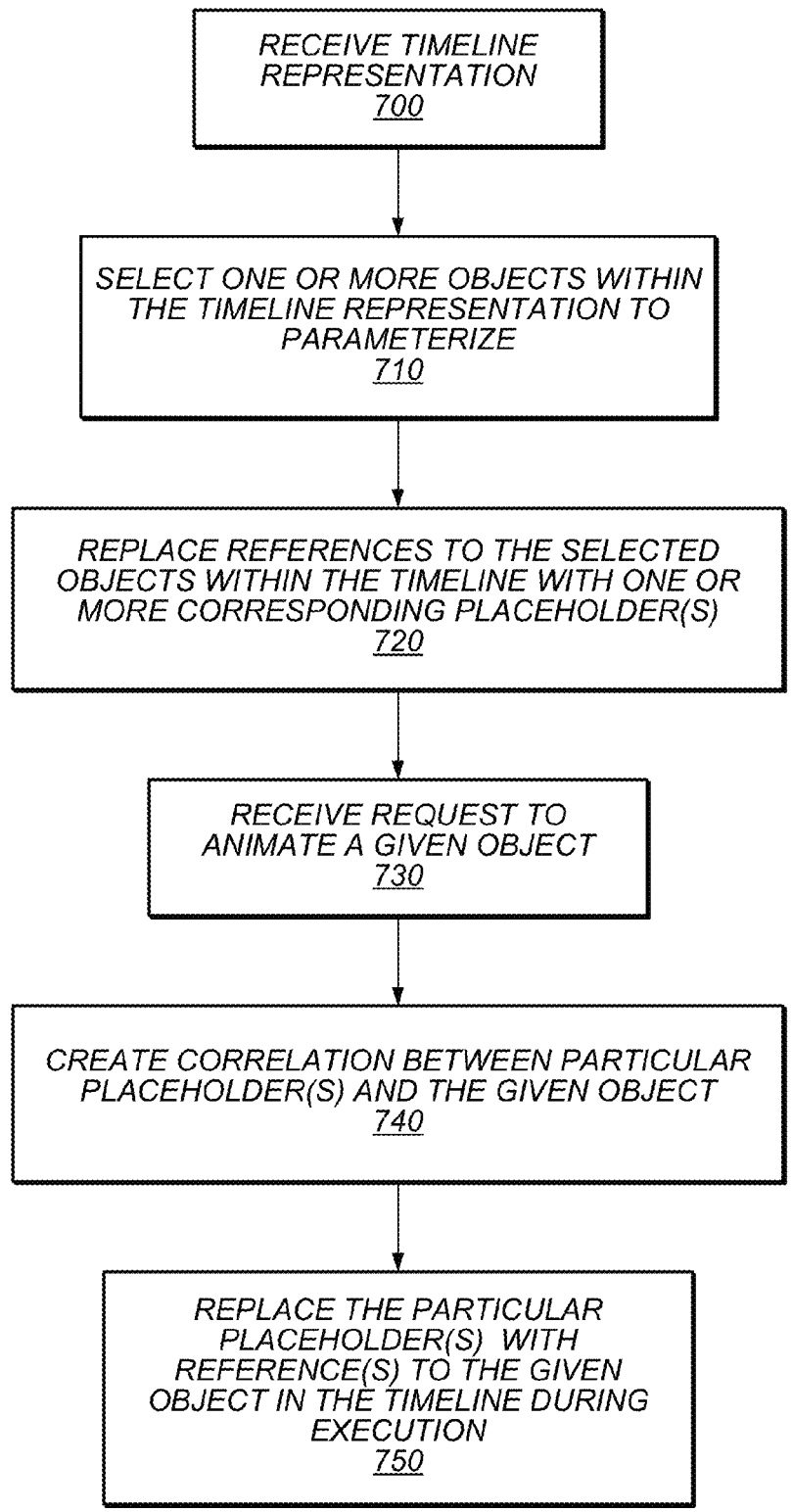
FIG. 7 is a flowchart of a method for parameterizing timelines according to some embodiments.

Turning to FIG. 7, a flowchart of a method for parameterizing a timeline is depicted according to some embodiments. At 700, the method receives a timeline representation of an animation. For sake of illustration, the received timeline representation may be the timeline data structure shown in FIG. 4. At 710, the method may select one or more original objects, actors, properties, and/or values within the timeline representation to parameterize. In some embodiments, a user of animation engine 120 may select individual elements freely (e.g., by "right-clicking" an element and selecting a "parameterize" option). In other embodiments, programmatic elements within animation engine 120 may automatically parameterize certain types of elements. For instance, animation engine 120 may monitor the addition of a particular type of actor (e.g., images) to the animation and automatically parameterize newly added actors of that type without further selection or user input.

At 720, the method may replace references to the selected objects within the timeline with one or more corresponding placeholders. In some embodiments, the user may select the string that serves as a placeholder for each parameterized element. In other embodiments, animation engine 120 automatically creates these placeholders. At 730, the method may receive a request to animate or otherwise modify new objects, actors, properties, and/or values that are different from the original ones. For example, a user may wish to substitute "image A" with "image B" in what is otherwise the same animation. At 740, the method may create a correlation between particular placeholders and the new objects, actors, properties, and/or values. This correlation may be achieved, for example, by the use of a dictionary of key/value pairs. In some embodiments, a dictionary may indicate a proper substitution of a placeholder in the parameterized timeline with a reference to the new objects, actors, properties, and/or values to be animated. Further, in some cases such a dictionary may be declaratively defined and/or it may be event-defined (e.g., created "on-the-fly") as discussed in more detail with respect to FIGS. 11 and 12 below.

FIG. 8 is an example of a parameterized timeline data structure according to some embodiments. In this example, the timeline data structure of FIG. 4 has been parameterized such that its two actors, "bike1" and "bike 2," have been replaced by placeholders 800 ("bikeToShow" and "bikeToHide," respectively). As a result, the same animation defined in the original timeline (i.e., the same sequence of tween commands) may now be applied to any actor by appropriately substituting placeholders 800 by the desired actors. In some embodiments, the syntax of a placeholder may differ from that shown in FIG. 8. For example the syntax of placeholders 800 may be implementation specific and/or dependent upon the type of object, actor, property, and/or value being parameterized, such that two different types of placeholders may be found within the same timeline data structure.

Figure 9:
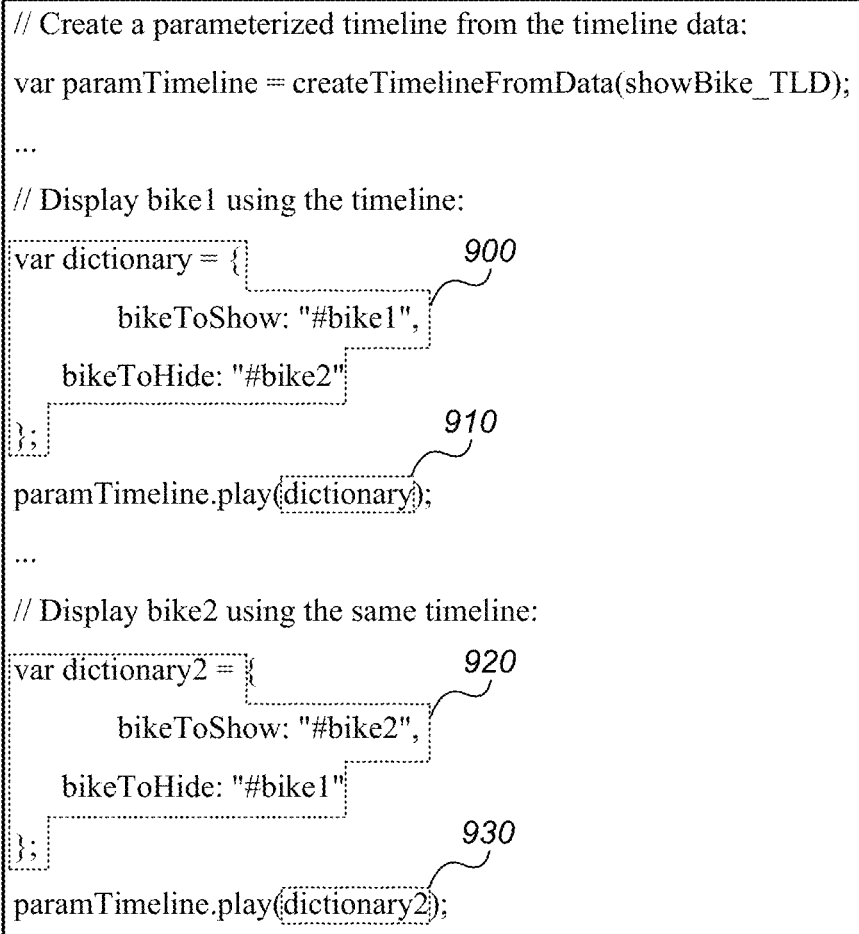
FIG. 9 is an example of parameterization dictionaries according to some embodiments.

Turning to FIG. 9, an example of parameterization dictionaries is shown according to some embodiments. As illustrated, the first line of code (var paramTimeline=createTimelineFromData(showBik_TLD) creates an instance of the parameterized timeline data structure shown in FIG. 8. Block 900 represents a first parameterization dictionary that indicates that "bikeToShow" be replaced with "bike1" and "bikeToHide" be replaced with "bike2." Block 910 indicates that, at run-time, the key/value pairs in the first parameterization dictionary should be used in the execution of the timeline. Similar to block 900, block 920 represents a second dictionary with inverted key/value pairs (i.e., it indicates that "bikeToShow" be replaced with "bike2" and "bikeToHide" be replaced with "bike1"). Also block 930 passes the second parameterization dictionary to the timeline during execution. As a result, a first animation may be rendered where "bike1" becomes visible as "bike2" disappears off the stage, followed by a second animation where "bike2" replaces "bike1." Notably, the two resulting animations are distinct from each other, despite both using the same parameterized timeline. Although shown in these examples as key/value pairs, in other embodiments the format or type of dictionaries used to resolve placeholders may be implementation specific and/or dependent upon the type of object, actor, property, and/or value being parameterized.

FIG. 10 is an example of another parameterized timeline data structure according to some embodiments. In this case, the data structure "ptimeline_TLD" has all of its elements parameterized. Particularly, each of actor ("bikeToShow"), property ("prop1"), value ("val1"), position ("pos"), duration ("duration"), and easing ("easing") has been replaced with a placeholder. Accordingly, the dictionary that follows provides a key/value pair for each such placeholder. This example shows that some of the techniques described herein may be applied to various aspects of a timeline implementation.

Figure 11:
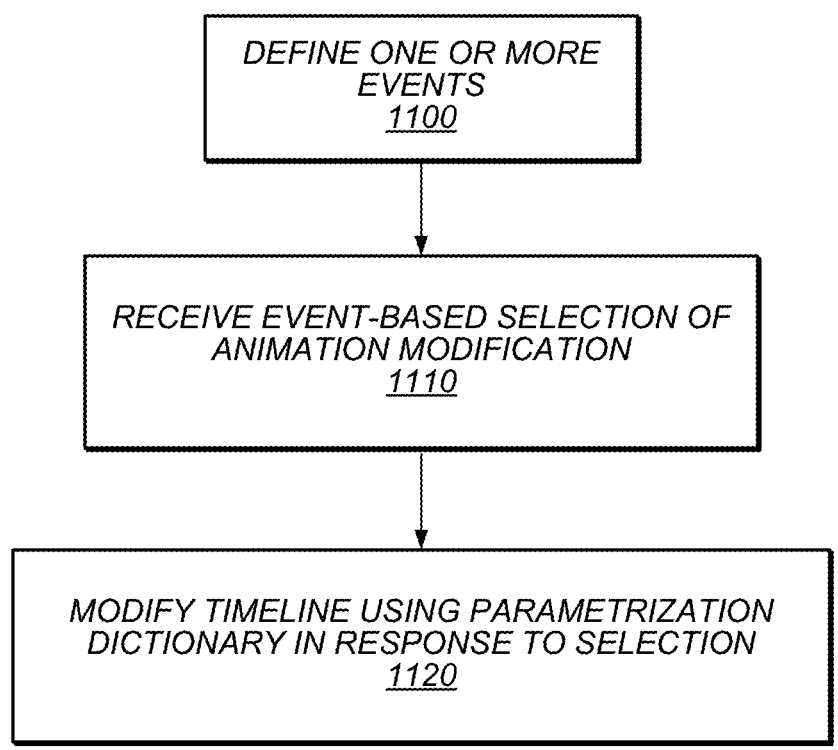
FIG. 11 is a flowchart of a method for creating and executing event-based parameter replacement according to some embodiments.

Turning to FIG. 11, a flowchart of a method for creating and executing event-based parameter replacement is depicted according to some embodiments. In some cases, rather that defining parameterization dictionaries declaratively, a key/value dictionary may be defined "on-the-fly" (i.e., during rendering of an animation). In some cases, such on-the-fly dictionary creation may be event-based, and may enable a viewer to affect the presentation of the animation at run-time. As illustrated, at 1100 the method may define one or more events (e.g., a clicking a button, hovering over a particular area of a display, etc.). At 1110 the method may receive an event-based selection that requests a modification of the animation. For example, a user may click on an icon representing "bike2" to insert it in place of "bike1" in an ongoing animation. At 1120 the method may modify the executing timeline using a parameterization dictionary that is created in response to the event-based selection of block 1110.

FIG. 12 is an example of an event-based parameter replacement function created and executed with the method depicted in FIG. 11 according to some embodiments. In this example, when a user clicks on one of "nav_Bike1," "nav_Bike2," or "nav_Bike3," a corresponding actor "large_Bike1," "large_Bike2," and "large_Bike3" is selected and replaced as "selectMember" in a parameterized timeline at run-time. Specifically, the code shown in FIG. 12 groups actors "large_Bike1," "large_Bike2," and "large_Bike3" into a selection group. As such, at any given time, one of these actors may be "marked" as selected. By default, the first one in the group is selected (i.e., "large_Bike1"). Whenever the current selection of a selection group is changed, an event called "ssSet_onSelect" is fired off. The code sets up a callback so that, when this event is fired off, it builds a dictionary dynamically that sets the "bikeToShow" to whatever is the currently selected item in the selection group, and "bikeToHide" to whatever is not selected. Note that, in this case, the bike that is not selected is more than one element. The timeline tweens can operate on more than one element, but those elements have the same property tweened in tandem at each step of the animation. The code also sets up callbacks on each thumbnail so that, whenever that thumbnail is clicked, it tells the selection group to make its corresponding "large" image the currently selected item. The act of setting the selection in this manner causes the "ssSet_onSelect" event to be fired, which then triggers the callback which builds the dynamic dictionary and passes it to the timeline.

Figure 13:
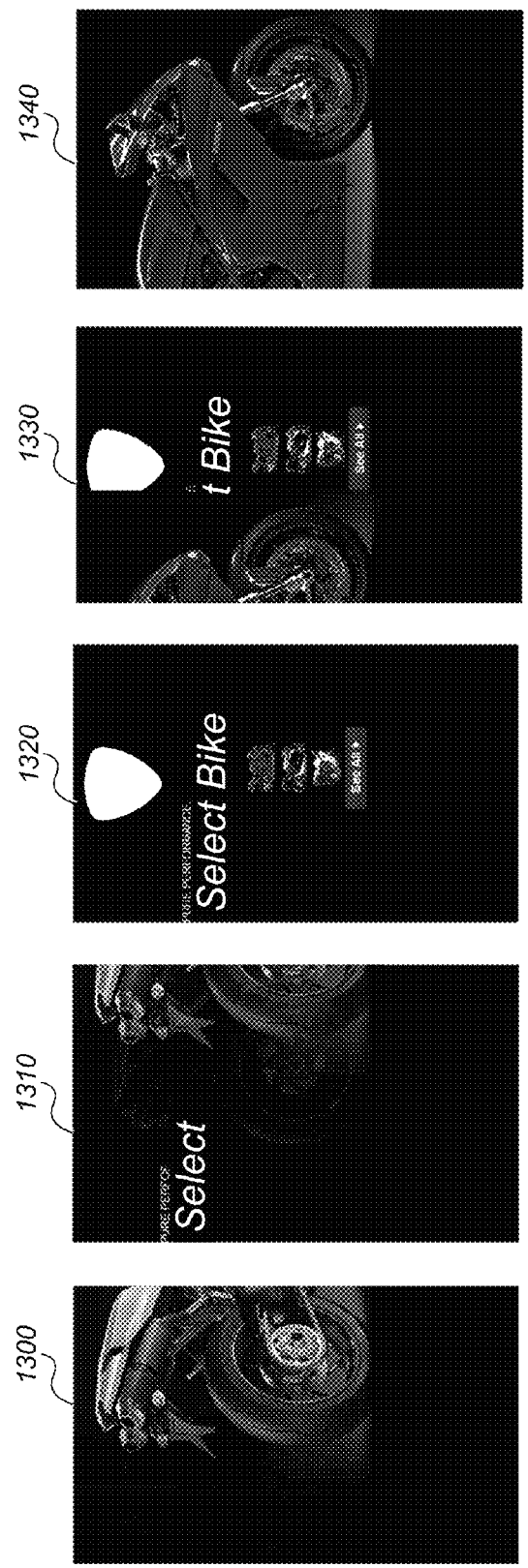
FIG. 13 shows screenshots of an animation generated according to some embodiments.

Turning now to FIG. 13 screenshots of an animation generated using techniques described herein are depicted according to some embodiments. As illustrated, 1300 and 1310 show "bike2" leave the stage upon execution of "tween" commands that create the animation. Thereafter, 1320 appears in the form of a menu, which allows a user to select one of three bikes (e.g., "bike 1," "bike 2," or "bike 3"). Upon selection of an event by the user (e.g., the user "clicks" on one of the three bikes), a corresponding key/value entry is created in a parameterization dictionary, and the selected bike enters the stage at 1330 and 1340.

In some embodiments, parameterization dictionary entries may be created upon events that are at least in part independent from a user's direct action. In some cases, for instance, a key/value entry may be created based on the user's browsing history and/or other information specific to that user. For example, if code within a webpage determines that a user is likely male, an animation may be presented that substitutes a placeholder with a reference to an image of a woman. Conversely, if the code determines that the user is probably female, the animation may replace the placeholder with a reference to an image of a man. In both cases, the underlying timeline that is executed to render the animation may be the same and/or similar. In some embodiments, a parameterized dictionary may have one or more entries generated based on one or more of the user's estimated and/or detected age, social network connections, visited websites, shopping history, etc. In other embodiments, placeholders may be substituted by references to specified actors, objects, properties, values, etc. based on a type of browser, a connection bandwidth, etc.

Although the examples above describe timeline parameterization in term of graphical elements, in other embodiments other types of elements may be parameterized. For example, an audio recording may have properties such as frequency bands, levels, etc. Hence, in an animation where an audio file (e.g., WAV, OGG, RIFF, RAW, AU, 25 AAC, MP4, MP3, WMA, RA, etc.) has one or more property values varying along a timeline (e.g., a dynamic equalizer that changes levels for one or more frequency bands over time), such a timeline may be parameterized with respect to one or more of those properties to enable a user to substitute one audio file for another without creating a separate animation or timeline data structure.

Property/Attribute Value Templates

Certain JavaScript frameworks may render an animation within a web browser at least in part by updating specific CSS style properties on one or more DOM elements at regular time intervals. The animation APIs for these frameworks typically allow the developer to specify the name of one or more numeric CSS properties to animate, a "to" value, and optionally a "from" value. These APIs usually restrict support to CSS properties that require a single "length" value that includes of a number and optionally a unit string, but typically cannot handle properties that require two or more numeric/length values and/or properties that have values wrapped with syntactic elements (e.g., "rgba(r,g,b,a)"). Furthermore, CSS presently adds support for more property values that have more complex formats having multiple optional components that may be specified in any suitable order.

FIG. 14 shows an example of a property having complex values according to some embodiments. This particular code example illustrates how the CSS "transform" property for two different functions or elements (named "foo" and "bar") may be specified. Generally, element may include a different number of transformation components (e.g., "scale," "rotate," "translate," and "translate," "scale," respectively), and the order of elements specified within each function. Notably, when dealing with these types of transformations, varying the ordering of the components or properties being operated upon typically produces different results. Although the foregoing example is based on CSS, other technologies may be subject to similar restrictions (e.g., SVG and its "@transform" and "@path" attributes). In some embodiments, techniques disclosed herein enable animation of complex properties and attributes, at least in part, by abstracting and/or separating the specification of the values used to animate the properties or attributes from the actual format used as the final value for those properties or attributes. Moreover, these techniques may be implemented without generating animation functions that are specific to each property and/or attribute.

Figure 15:
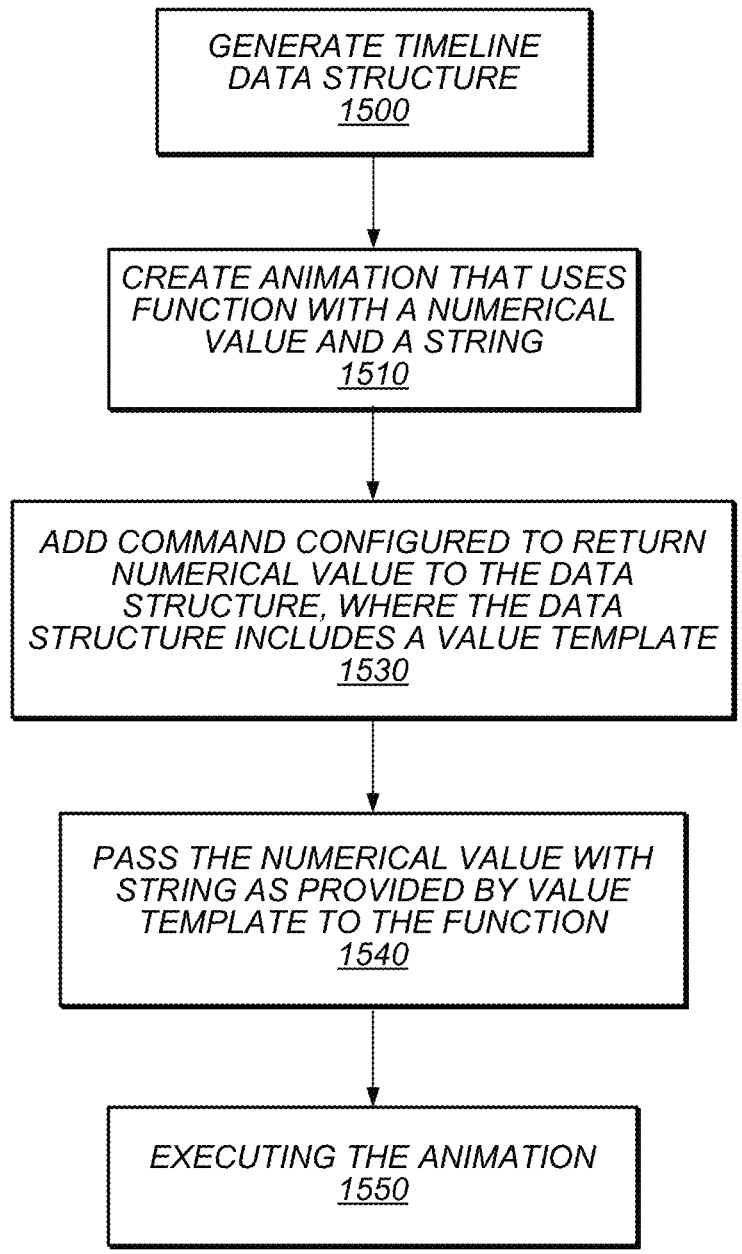
FIG. 15 is a flowchart of a method for using value templates in a timeline data structure according to some embodiments.

Turning now to FIG. 15, a flowchart of a method for using value templates in animation timelines is depicted according to some embodiments. At 1500, the method generates a data structure corresponding to a graphical representation of a timeline. For example, the data structure may be a declarative timeline data structure similar to those described in detail above. At 1510, the method may allow a user to create an animation of an object (e.g., an image) along the timeline. In some embodiments, the animation modifies an image property according to a function (e.g., a library function, etc.), and the function uses a combination of a numerical value with a string to render the animation. At 1520, the method may add a command corresponding to the animation into the data structure. For example, in some embodiments the command may be a tween command, or the like. Moreover, the command may be configured to return the numerical value needed by the function to execute the animation.

In some embodiments, the timeline data structure and/or command may include a value template that adds text or a string to the numerical value produced by the command and yields a combination of the numerical value with the text or string. In some cases, the value template may include a placeholder; in other cases, a key/value dictionary may provide similar functionality. Additionally or alternatively, the value template may also change the format of the numerical value. Examples of such value templates are discussed below with respect to FIGS. 16-20. At 1540, the method may pass the numerical value with the string to the function, and, at 1550, the method may use the function to animate the image.

FIG. 16 is an example of a timeline data structure having a value template according to some embodiments. As illustrated, a timeline data structure ("timeline_TLD") is presented in declarative form, and calls for a "tween" modification of a "transform" CSS property. Block 1600 shows a "to" property value, whereas block 1610 provides an optional "from" property value. (In some cases, in the absence of block 1610, the "from" value is set to the current value of that property.) In addition, block 1620 shows a "value template" having a "(rotate@@0@@)" placeholder. As noted in the parameterization section above, in other embodiments the syntax of the placeholder of block 1620 may differ from the one shown in FIG. 16 and/or it may be implementation specific.

At run-time, an algorithm similar to that described with respect to FIG. 5 may parse the timeline data structure and pass each parsed command to the function along with the value template. In the example of FIG. 16, at every stage of the animation of the tween command, the correct value between "0 deg" and "90 deg" may be calculated, and then formatted using the placeholder in value template 1620 when the value is about to be set to trigger an update on the screen. For example, if the tween animation is at 50% of its duration, a "45 deg" value would be calculated, but the actual value that would be set for the property would be "rotate(45 deg)." As a result, the value template within the timeline data structure may effectively add text or a string to the output value of its respective command.

Turning now to FIG. 17, an example of a timeline data structure having a value template that uses an array of values is depicted according to some embodiments. In this example, block 1700 shows two "to" values, and block 1610 shows two corresponding "from" values. In this case, the tween command is processing an array of values for two distinct properties (i.e., "translate" and "rotate"). Accordingly, the value template within the data structure provides two placeholders "translate( . . . ,@@0@@)" and "rotate(@@1@@)," respectively. Moreover, in this particular implementation, the syntax of the placeholder includes an index ("0" and "1," respectively) that may be used to provide a particular ordering to the output of the tween command (i.e., the first element of the output value array is associated with the "translate" placeholder, whereas the second element is associated with the "rotate" placeholder). As such, in this example, at 50% of the tween duration, the value that is actually passed to the CSS transform function is "translate(100 px, 250 px) rotate(45 deg)."

FIG. 18 is an example of a timeline data structure having a value template that uses a dictionary of values according to some embodiments. This example is functionally similar to the one provided in FIG. 17 and declares the same "to" values in block 1800. However, the "from" values of block 1810 are shown as keys of a dictionary, and place holders 1820 use keys "y" and "angle" to allow a parsing algorithm (e.g., the algorithm shown in FIG. 5) to order the output values provided by executing the tween command. In other words, the values for both the "to" and "from" properties are the same as FIG. 17, but instead of the values being stored in an array (where the ordinal position is the "key" to the "dictionary"), the values in FIG. 18 are stored in a dictionary object where the keys are names, which in this case are semantic ("y" and "angle").

In some embodiments, in addition to providing a string or text to be combined with output numerical values, certain techniques described herein may allow formatting of those numerical values. FIG. 19 is an example of a timeline data structure having a formatting function within a placeholder. In this case, value template 1900 contains two placeholders that make use of formatting functions. Placeholder "@@round(y)@@" rounds the calculated value of "y" up or down to the nearest whole number, whereas placeholder "@@floor(angle)@@" rounds the calculated value of "angle" down to the closest whole number. Example of other rounding functions or indicators that may be implemented within placeholders include, but are not limited to, formatting functions that provide hexadecimal or binary values, ceiling values, limit decimal places, apply a filter, etc.

FIG. 20 is an example of a timeline data structure having a user-defined formatting function according to some embodiments. This example is similar to the one depicted in FIG. 19, but rather than placing a formatting indicator within a given placeholder in block 1910, a "formatters" statement in block 1910 enables a user to define formatting functions (e.g., "Math.round" and "Math.floor") that may be applied to the output values of the tween command using the same (or a similar) key/value dictionary used to associate those output values with their respective placeholders.

In some embodiments, the value template techniques described above may also be used to format or otherwise provide an indication of a particular color space (e.g., RGB, CMYK, grayscale, etc.) manipulated by an animation function. For example, a placeholder may include a color space's corresponding string and/or change the formatting of the numerical values for each color element (e.g., decimal to hexadecimal) that is passed to the animation function.

A Computer System

Figure 21:
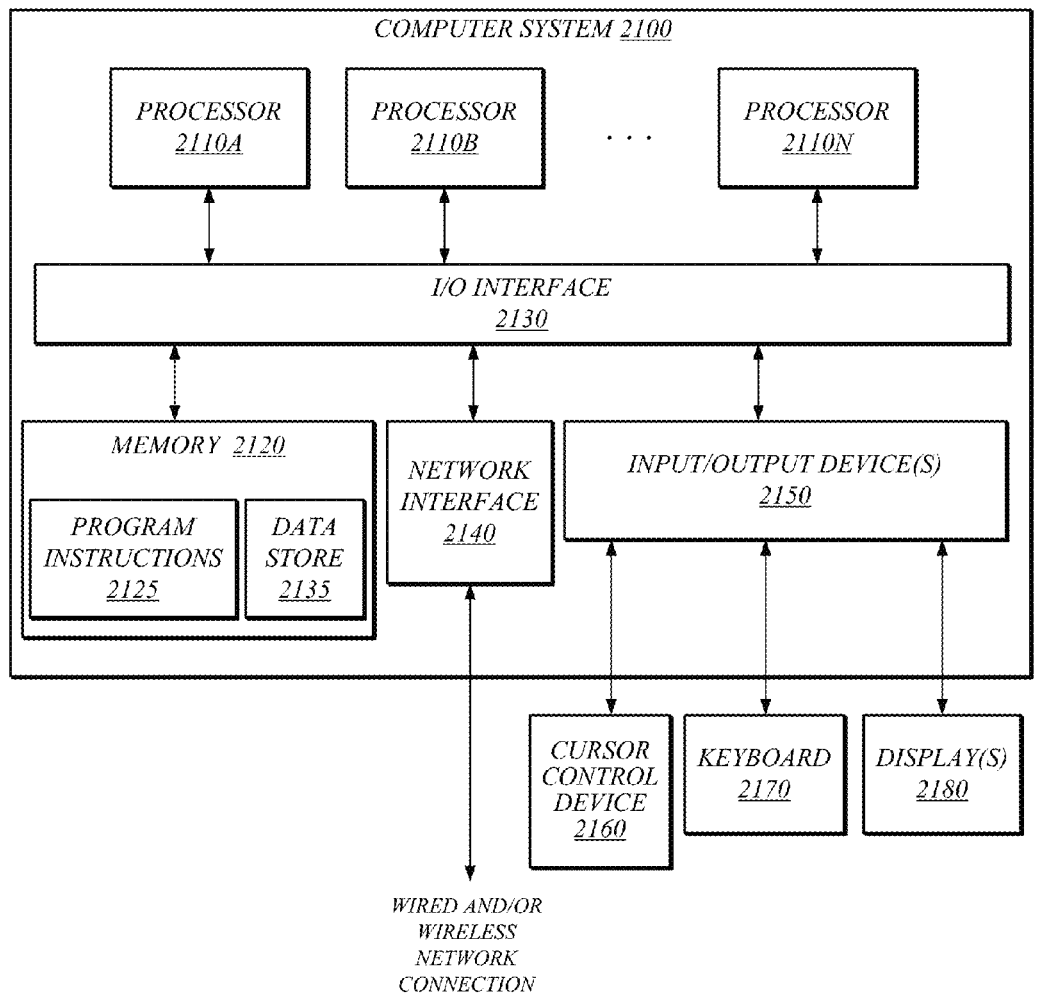
FIG. 21 a block diagram of a computer system configured to implement systems and methods disclosed herein according to some embodiments.

Embodiments of a system and method for parameterizing timelines, as described herein, may be executed on one or more computer systems, which may interact with various other devices. One such computer system is illustrated by FIG. 21. In different embodiments, computer system 2100 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In the illustrated embodiment, computer system 2100 includes one or more processors 2110 coupled to a system memory 2120 via an input/output (I/O) interface 2130. Computer system 2100 further includes a network interface 2140 coupled to I/O interface 2130, and one or more input/output devices 2150, such as cursor control device 2160, keyboard 2170, and display(s) 2180. In some embodiments, it is contemplated that embodiments may be implemented using a single instance of computer system 2100, while in other embodiments multiple such systems, or multiple nodes making up computer system 2100, may be configured to host different portions or instances of embodiments. For example, in one embodiment some elements may be implemented via one or more nodes of computer system 2100 that are distinct from those nodes implementing other elements.

In various embodiments, computer system 2100 may be a uniprocessor system including one processor 2110, or a multiprocessor system including several processors 2110 (e.g., two, four, eight, or another suitable number). Processors 2110 may be any suitable processor capable of executing instructions. For example, in various embodiments, processors 2110 may be general-purpose or embedded processors implementing any of a variety of instruction set architectures (ISAs), such as the x86, PowerPC®, ARM®, SPARC®, or MIPS® ISAs, or any other suitable ISA. In multiprocessor systems, each of processors 2110 may commonly, but not necessarily, implement the same ISA.

In some embodiments, at least one processor 2110 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the methods and techniques disclosed herein may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA® Corporation, ATI® Technologies (AMD®), and others.

System memory 2120 may be configured to store program instructions and/or data accessible by processor 2110. In various embodiments, system memory 2120 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for embodiments of an animation module (such as animation module 120) are shown stored within system memory 2120 as program instructions 2125 and data storage 2135, respectively. In other embodiments, program instructions and/or data may be received, sent or stored upon different types of computer-accessible media or on similar media separate from system memory 2120 or computer system 2100. Generally speaking, a computer-accessible medium may include storage media or memory media such as magnetic or optical media—e.g., disk or CD/DVD-ROM coupled to computer system 2100 via I/O interface 2130. Program instructions and data stored on a non-transitory computer-accessible medium may further be transmitted by transmission media or signals such as electrical, electromagnetic, or digital signals, which may be conveyed via a communication medium such as a network and/or a wireless link, such as may be implemented via network interface 2140.

In one embodiment, I/O interface 2130 may be configured to coordinate I/O traffic between processor 2110, system memory 2120, and any peripheral devices in the device, including network interface 2140 or other peripheral interfaces, such as input/output devices 2150. In some embodiments, I/O interface 2130 may perform any necessary protocol, timing or other data transformations to convert data signals from one component (e.g., system memory 2120) into a format suitable for use by another component (e.g., processor 2110). In some embodiments, I/O interface 2130 may include support for devices attached through various types of peripheral buses, such as a variant of the Peripheral Component Interconnect (PCI) bus standard or the Universal Serial Bus (USB) standard, for example. In some embodiments, the function of I/O interface 2130 may be split into two or more separate components, such as a north bridge and a south bridge, for example. In addition, in some embodiments some or all of the functionality of I/O interface 2130, such as an interface to system memory 2120, may be incorporated directly into processor 2110.

Network interface 2140 may be configured to allow data to be exchanged between computer system 2100 and other devices attached to a network, such as other computer systems, or between nodes of computer system 2100. In various embodiments, network interface 2140 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 2150 (e.g., "user input 112" in FIG. 1) may, in some embodiments, include one or more display terminals, keyboards, keypads, touchpads, scanning devices, voice or optical recognition devices, or any other devices suitable for entering or retrieving data by one or more computer system 2100. Multiple input/output devices 2150 may be present in computer system 2100 or may be distributed on various nodes of computer system 2100. In some embodiments, similar input/output devices may be separate from computer system 2100 and may interact with one or more nodes of computer system 2100 through a wired or wireless connection, such as over network interface 2140.

As shown in FIG. 21, memory 2120 may include program instructions 2125, configured to implement certain embodiments described herein, and data storage 2135, comprising various data accessible by program instructions 2125. In an embodiment, program instructions 2125 may include software elements of embodiments illustrated in the above figures. For example, program instructions 2125 may be implemented in various embodiments using any desired programming language, scripting language, or combination of programming languages and/or scripting languages, e.g., C, C++, C#, Java™, JavaScript™, Perl, etc. Data storage 2135 may include data that may be used in these embodiments. In other embodiments, other or different software elements and data may be included.

A person of ordinary skill in the art will appreciate that computer system 2100 is merely illustrative and is not intended to limit the scope of the disclosure described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 2100 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

A person of ordinary skill in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 2100 may be transmitted to computer system 2100 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

The various methods as illustrated in the figures and described herein represent example embodiments of methods. The methods may be implemented in software, hardware, or a combination thereof. The order of method may be changed, and various elements may be added, reordered, combined, omitted, modified, etc. Various modifications and changes may be made as would be obvious to a person of ordinary skill in the art having the benefit of this specification. It is intended that the invention embrace all such modifications and changes and, accordingly, the above description to be regarded in an illustrative rather than a restrictive sense.

The invention claimed is:

1. A method, comprising:
performing, by one or more computing devices:
generating a data structure corresponding to a graphical representation of a timeline;
defining an animation of an element that modifies a property of the element according to a function, the animation defined relative to the timeline, and the function configured to render the animation given a combination of a string with a numerical value;
adding a command corresponding to the animation into the data structure, the command configured to return the numerical value, and the data structure including a value template that is parameterized to produce the combination of the string with the numerical value at run-time using the numerical value returned by the command;
passing, at multiple stages of the animation of the element, the combination of the string with the numerical value that is produced according to the value template of the data structure to the function, the combination of the string with the numerical value passed for one of the stages being different from the combination of the string with the numerical value passed for at least one other stage; and
executing the function to animate the element as specified by the combination of the string with the numerical value at each of the stages of the animation.

2. The method of claim 1, wherein the function includes a Cascading Style Sheets (CSS) or a Scalable Vector Graphics (SVG) function.

3. The method of claim 2, wherein the function is a transformation function.

4. The method of claim 3, wherein the property includes at least one of a rotate property, a translate property, or a scale property.

5. The method of claim 1, wherein the command is a tween command.

6. The method of claim 1, wherein the command is configured to return an array or dictionary of numerical values.

7. The method of claim 6, wherein the element is at least one of an image, a video, or an audio, wherein the animation modifies two or more properties of the element, and wherein the value template is configured to enable each of the numerical values to be assigned to parameters in the value template at run-time that cause each of the numerical values in the array or dictionary to be combined with a corresponding string.

8. The method of claim 1, wherein the value template is configured to modify a format of the returned numerical value.

9. A computer-readable storage device having instructions stored thereon that, upon execution by a computer system, cause the computer system to perform operations comprising:
receiving a request to render an animation of an element;

parsing a command within a data structure corresponding to the animation of the element at multiple different stages of the animation, the command configured to output a numerical value calculated at each of the stages, and the data structure including a value template that is parameterized to produce a modified version of the numerical value at each of the stages by assigning the numerical value calculated to a parameter in the value template that is suitable to enable modification of different numerical values assigned to the parameter, the numerical value calculated for one of the stages being different from the numerical value calculated for at least one other stage;

executing the command; and rendering the animation, at least in part, by providing the modified version of the numerical value that is produced by the value template at each of the stages to a function configured to apply the modified version of the numerical value to an object property, the animation rendered to reflect application of the modified version of the numerical value to the object property.

10. The computer-readable storage device of claim 9, wherein to produce the modified version of the numerical value, the value template is configured to wrap the numerical value with a string defined by the function.

11. The computer-readable storage device of claim 9, wherein the request to render the animation includes a request to display a HyperText Markup Language (HTML) page on a web browser.

12. The computer-readable storage device of claim 9, wherein the function includes a Cascading Style Sheets (CSS) or a Scalable Vector Graphics (SVG) function.

13. The computer-readable storage device of claim 9, wherein the image property includes at least one of a rotate property, a translate property, or a scale property.

14. The computer-readable storage device of claim 9, wherein the command is configured to output an array of numerical values, wherein the animation modifies two or more object properties, and wherein the value template is configured to enable each of the numerical values to be assigned to parameters in the value template that cause each of the numerical values of the array to be combined with a corresponding string.

15. The computer-readable storage device of claim 9, wherein the value template is configured to change a format of the numerical value output by the command to produce the modified version of the numerical value.

16. A system, comprising:
at least one processor; and
a memory coupled to the at least one processor, wherein the memory stores program instructions, and wherein the program instructions are executable by the at least one processor to perform operations comprising:
receiving a request to render an animation defined relative to a timeline data structure that includes a plurality of commands;
parsing the plurality of commands;
executing at least one of the plurality of commands, the at least one command corresponding to the animation and configured to be executed at multiple stages of the animation;
in response to the execution of the at least one command at each stage, receiving an output property value calculated for a given stage from the at least one command;
adding a string to the output property value calculated for the given stage, the string being added according to a value template declared within the timeline data structure that assigns the output property value calculated at each of the stages to a parameter suitable to enable modification of the output property value to produce a modified output property value; and
passing the modified output property value to a library function that is configured to enable rendering of the animation given the modified output property value at each of the stages.

17. The system of claim 16, wherein the request to render the animation includes a request to display a HyperText Markup Language (HTML) document.

18. The system of claim 16, the operations further comprising formatting the modified output property value prior to said passing.

19. The system for claim 18, wherein the formatting is defined by a statement within the value template.

20. The system for claim 18, wherein the formatting is defined by a statement outside of the value template.

* * * * *